United States Patent
McClelland et al.

(10) Patent No.: US 6,627,165 B2
(45) Date of Patent: Sep. 30, 2003

(54) PROCESS FOR UPGRADING A TITANIFEROUS MATERIAL CONTAINING SILICA

(75) Inventors: Ross Alexander McClelland, Maryknoll (AU); Michael John Hollitt, Box Hill North (AU)

(73) Assignee: Technological Resources PTY LTD, Melbourne (AU)

( * ) Notice: Subject to any disclaimer, the term of this patent is extended or adjusted under 35 U.S.C. 154(b) by 0 days.

(21) Appl. No.: 09/893,769

(22) Filed: Jun. 28, 2001

(65) Prior Publication Data

US 2002/0168310 A1 Nov. 14, 2002

Related U.S. Application Data

(63) Continuation of application No. 08/722,026, filed as application No. PCT/AU95/00222 on Apr. 18, 1995, now abandoned.

(30) Foreign Application Priority Data

Apr. 15, 1994 (AU) .............................................. PM5119

(51) Int. Cl.⁷ ......................... C01B 33/00; C01G 23/00; C01F 7/00
(52) U.S. Cl. ........................ 423/82; 423/84; 423/118.1; 423/132
(58) Field of Search .......................... 423/82, 84, 118.1, 423/132

(56) References Cited

U.S. PATENT DOCUMENTS 5,011,666 A * 4/1991 Chao et al.

FOREIGN PATENT DOCUMENTS

| AU | 639178 | * | 10/1992 |
| AU | 639390 | * | 10/1992 |
| WO | 94/03647 | * | 2/1994 |
| WO | 94/04709 | * | 3/1994 |
| WO | 95/07366 | * | 3/1995 |

* cited by examiner

Primary Examiner—Steven Bos
(74) Attorney, Agent, or Firm—Dennison, Schultz & Dougherty

(57) ABSTRACT

A process for upgrading of titaniferous material containing silica, including pretreating the titaniferous material by alkaline leaching to precipitate the silica as an aluminosilicate which is amenable to further leaching. Subsequently, the pretreated titaniferous material is leached under acid conditions, causing the silica to enter solution under conditions such that the silica is not hydrolysed or precipitated as a silicate.

4 Claims, No Drawings

PROCESS FOR UPGRADING A TITANIFEROUS MATERIAL CONTAINING SILICA

This application is a continuation of Ser. No. 08/722,026 filed Jan. 3, 1997, now abandoned.

BACKGROUND OF THE INVENTION

The present invention relates to the removal of impurities from a titaniferous material.

The term "titaniferous material" is understood herein to mean a material which contains at least 2 wt % titanium.

In a particular embodiment the present invention provides a process whereby silica and alumina are removed from a titaniferous material using an aqueous leach in the presence of acid, with the effectiveness of the leach in removing these impurities enhanced by the combination of pretreatments and the conditions of the leach.

In industrial chlorination processes titanium dioxide bearing feedstocks are fed with coke to chlorinators of various designs (fluidised bed, shaft, molten salt), operated to a maximum temperature in the range 700–1200° C. The most common type of industrial chlorinator is of the fluidised bed design. Gaseous chlorine is passed through the titania and carbon bearing charge, converting titanium dioxide to titanium tetrachloride gas, which is then removed in the exit gas stream and condensed to liquid titanium tetrachloride for further purification and processing.

The chlorination process as conducted in industrial chlorinators is well suited to the conversion of pure titanium dioxide feedstocks to titanium tetrachloride. However, most other inputs (i.e. impurities in feedstocks) cause difficulties which greatly complicate either the chlorination process itself or the subsequent stages of condensation and purification. The attached table provides an indication of the types of problems encountered. In addition, each unit of inputs which does not enter products contributes substantially to the generation of wastes for treatment and disposal. Some inputs (e.g. heavy metals, radioactives) result in waste classifications which may require specialist disposal in monitored repositories.

Preferred inputs to chlorination are therefore high grade materials, with the mineral rutile (at 95–96% $TiO_2$) the most suitable of present feeds. Shortages of rutile have led to the development of other feedstocks formed by upgrading naturally occurring ilmenite (at 40–60° $TiO_2$), such as titaniferous slag (approximately 86% $TiO_2$) and synthetic rutile (variously 92–95% $TiO_2$). These upgrading processes have had iron removal as a primary focus, but have extended to removal of manganese and alkali earth impurities, as well as some aluminium.

| Elemental Input | Chlorination | Condensation | Purification |
|---|---|---|---|
| Fe, Mn | Consumes chlorine, coke, increases gas volumes | Solid/liquid chlorides foul ductwork, make sludges | |
| Alkali & alkali earth metals | Defluidise fluid beds due to liquid chlorides, consume chlorine, coke | | |
| Al | Consumes chlorine, coke | Causes corrosion | Causes corrosion, makes sludges |
| Si | Accumulates in chlorinator, reducing campaign life. Consumes coke, chlorine | Can encourage duct blockage. Condenses in part with titanium tetrachloride | May require distillation from product |
| V | | | Must be removed by chemical treatment and distillation |
| Th, Ra | Accumulates in chlorinator brickwork, radioactive; causes disposal difficulties | | |

In the prior art synthetic rutile has been formed from titaniferous minerals, e.g. ilmenite, via various techniques. According to the most commonly applied technique, as variously operated in Western Australia, the titaniferous mineral is reduced with coal or char in a rotary kiln, at temperatures in excess of 1100° C. In this process the iron content of the mineral is substantially metallised. Sulphur additions are also made to convert manganese impurities partially to sulphides. Following reduction the metallised product is cooled, separated from associated char, and then subjected to aqueous aeration for removal of virtually all contained metallic iron as a separable fine iron oxide. The titaniferous product of separation is treated with 2–5% aqueous sulphuric acid for dissolution of manganese and some residual iron. There is no substantial chemical removal of alkali or alkaline earths, aluminium, silicon, vanadium or radionuclides in this process as disclosed or operated. Further, iron and manganese removal is incomplete.

Recent disclosures have provided a process which operates reduction at lower temperatures and provides for hydrochloric acid leaching after the aqueous aeration and iron oxide separation steps. According to disclosures the process is effective in removing iron, manganese, alkali and alkaline earth impurities, a substantial proportion of aluminium inputs and some vanadium as well as thorium. The process may be operated as a retrofit on existing kiln based installations. However, the process is ineffective in full vanadium removal and has little chemical impact on silicon.

In another prior art invention relatively high degrees of removal of magnesium, manganese, iron and aluminium have been achieved. In one such process ilmenite is first thermally reduced to substantially complete reduction of its ferric oxide content (i.e. without substantial metallisation), normally in a rotary kiln. The cooled, reduced product is then leached under 35 psi pressure at 140–150° C. with excess 20% hydrochloric acid for removal of iron, magnesium, aluminium and manganese. The leach liquors are spray roasted for regeneration of hydrogen chloride, which is recirculated to the leaching step.

In other processes the ilmenite undergoes grain refinement by thermal oxidation followed by thermal reduction (either in a fluidised bed or a rotary kiln). The cooled, reduced product is then subjected to atmospheric leaching with excess 20% hydrochloric acid, for removal of the deleterious impurities. Acid regeneration is also performed by spray roasting in this process.

In all of the above mentioned hydrochloric acid leaching based processes impurity removal is similar. Vanadium, aluminium and silicon removal is not fully effective.

In yet another process ilmenite is thermally reduced (without metallisation) with carbon in a rotary kiln, followed by cooling in a nonoxidising atmosphere. The cooled, reduced product is leached under 20–30 psi gauge pressure at 130° C. with 10–60% (typically 18–25%) sulphuric acid, in the presence of a seed material which assists hydrolysis of dissolved titania, and consequently assists leaching of impurities. Hydrochloric acid usage in place of sulphuric acid has been claimed for this process. Under such circumstances similar impurity removal to that achieved with other hydrochloric acid based systems is to be expected. Where sulphuric acid is used radioactivity removal will not be complete.

A commonly adopted method for upgrading of ilmenite to higher grade products is to smelt ilmenite with coke addition in an electric furnace, producing a molten titaniferous slag (for casting and crushing) and a pig iron product. Of the problem impurities only iron is removed in this manner, and then only incompletely as a result of compositional limitations of the process.

A wide range of potential feedstocks is available for upgrading to high titania content materials suited to chlorination. Examples of primary titania sources which cannot be satisfactorily upgraded by prior art processes for the purposes of production of a material suited to chlorination include hard rock (non detrital) ilmenites, siliceous leucoxenes, many primary (unweathered) ilmenites and large anatase resources. Many such secondary sources (e.g. titania bearing slags) also exist.

Clearly there is a considerable incentive to discover methods for upgrading of titaniferous materials which can economically produce high grade products almost irrespectively of the nature of the impurities in the feed.

At present producers of titania pigment by the choride process require feedstocks to have silica levels as low as possible. In general most feedstocks are less than 2% $SiO_2$. Where, for various reasons, feedstocks with high levels of silica may be taken in, they are blended against other low silica feedstocks, often with significant cost and productivity penalties. Therefore suppliers of titaniferous feedstocks for chlorination traditionally select ores and concentrates which will result in beneficiated products with low levels of silica. This is generally achieved by mineral dressing techniques based on physical separations. In these processes it is only possible to reject essentially the majority of free quartz particles without sacrificing recovery of the valuable titania minerals. A level of mineralogically entrained silica will normally remain in titaniferous concentrates. In the upgrading processes for ilmenite to synthetic rutile which are presently operated, the removal of iron and other major impurities result in a concentration effect for the silica which exacerbates the requirements for ilmenite concentrates as feedstocks to upgrading plants. Silica is not removed by any commercial upgrading process.

Chemical removal of silica from titaniferous concentrates and upgraded materials can be achieved theoretically by aqueous leaching under alkaline conditions. However, when such leaching is attempted under practical conditions it has been found that the effectiveness of the leach is reduced by forms of silica in the material which are not amenable to alteration, i.e. are inert to leaching, or by reactions between silica which has entered solution and other components of the titaniferous material which result in the precipitation of solid siliceous material. This precipitation thus limits the effectiveness of the leach in removing silica.

Thus, in the prior art, silica and other impurities have been removed from titaniferous materials by aqueous leaching with very high excesses of simple caustic solutions. An excess is necessary to prevent impurities present within the titaniferous materials (e.g. alumina) from interfering with the effectiveness of the leach. In some cases, the spent leachants, containing excesses of unused reagent are directly discarded. Recycle of leachant simply has the effect of concentrating deleterious impurities in the leachant and reducing the effectiveness of the leach. The cost of the caustic leachant in such cases is prohibitive, especially when neutralisation costs incurred for the purpose of liquor discard into the environment are considered.

There is no prior art in existence or contemplated in which removal of silica in a leach conducted in the presence of acid is indicated to be effective for the treatment of titaniferous materials. In summary there is presently no industrially realistic process for the effective removal of silica from titaniferous materials.

SUMMARY OF THE INVENTION

Accordingly, the present invention provides an industrially realistic process for upgrading of titaniferous materials, which process comprises the following steps:

(i) a pretreatment which has the effect of rendering silica amenable to leaching under the particular conditions of a subsequent leach, and (ii) an aqueous leach in the presence of an acid, the conditions of which are chosen such that silica which enters solution is not hydrolysed or precipitated as a silicate.

It is preferred that pretreatment step (i) includes an aqueous caustic treatment.

DETAILED DESCRIPTION OF THE INVENTION

It has been surprisingly discovered that the process of the invention can remove silica, alumina and other impurities.

The treatment in step (i) may include any treatment which has the effect of ensuring that the form of the silica in the titaniferous material entering step (ii) is amenable to alteration under the conditions of step (ii). For example, the treatment may include smelting of the titaniferous material to make a titaniferous slag. It may include roasting of the titaniferous material with additives which have the effect in roasting of converting contained silica to silicates or transferring Silica into a glassy phase. The treatment may also be an alkaline leach treatment, with or without other additives, which has the effect of converting silica to amorphous or crystalline silicates. The treatment may be a combination of these treatments or of these treatments and other treatments which in combination have the desired effect.

Step (i) may be conducted in any suitable equipment, which equipment will depend in part on the method chosen to perform this step.

Step (ii) is a leach conducted in the presence of acid. Any suitable acid may be used, including hydrochloric and sulphuric acids, but also including weak acids such as organic acids and sulphurous acid. However, the leach step must be conducted in such a manner that precipitation of silica to a solid precipitate or gel is avoided. The most effective means of ensuring that hydrolysis is avoided is by conducting the leach at low solids densities, thereby limiting the level of silica in the solution.

The leach may be conducted in any suitable arrangement. Typically it will be conducted in stirred tank reactors. Leaching may be conducted in multiple stages or in a single stage, continuously or in batches. Solids and liquids flows through leaching may be cocurrent or countercurrent. Reagents may be added stagewise to maintain reagent strength through the leach or may be added in a single stage.

Solid/liquid separation may be conducted after leaching in any suitable manner, including cycloning, thickening, filtration, pressure filtration and centrifugation. The spent leachant may be cycled through leachant treatment for the removal of impurities and back into the leach. Alternatively, spent leachant may be discarded or proceed to be used in other process stages.

Additional steps may be incorporated into the process as desired. For example:
(i) The leach residue may pass to further processing, e.g. hot acid leaching for the removal of impurities such as iron, magnesium and manganese.
(ii) The leach residue may be washed.
(iii) The leach residue may be dried and/or calcined and/or agglomerated.
(iv) Where leachant is recycled a bleed stream may be removed in order to limit the concentration of particular impurities.
(v) A proportion of the wash liquors may be recycled as water make up.
(vi) The process may be preceded by upgrading of the titaniferous material for the removal of impurities such as iron, magnesium and manganese, and partial removal of silica and alumina.
(vii) Spent leachant and wash streams, whether or not treated for silica removal, may report to leach/acid regeneration circuits wherein any radioactive elements removed in leaching are deported to a suitable solid residue.

Clearly there is great flexibility within the process as disclosed to accommodate a wide range of feed materials, as well as pretreatment, leach and solution treatment conditions and arrangements. The process steps disclosed herein may be incorporated in any Suitable manner into any other process operated for the purpose of the upgrading of titaniferous materials.

EXAMPLES

Example 1

This example illustrates a multi stage pretreatment followed by a leach in the presence of acid which has the effect of silica removal.

A titaniferous concentrate was ground, mixed and agglomerated with the addition of 0.65% anydrous borax and 0.65% soda, added as sodium carbonate, and roasted with char at 1000° C. The composition of the roasted product after char separation is given in Table 1. The roasting was conducted to enhance the amenability of silica in the fees to subsequent leaching by formation of a glassy phase.

The roasted material was subjected to leaching with boiling 45 gpL NaOH in the presence of 45 gpL Na2B4O7, 1.8 gpL $SiO_2$ and 0.66 gpL $Al_2O_3$ under reflux at 5% solids density for 4 hours. The leach residue (after solid/liquid separation and washing) contained 2.53% $SiO_2$ and 1.04% $Al_2O_3$. That is, silica and alumina removal was ineffective. However, with the exception of inert silica and alumina the form of alumina and silica in the residue had been converted to aluminosilicates of the feldspathoid type.

The leach residue was then subjected to room temperature (25° C.) leaching with 100 gpL sulphurous acid at 10% solids density for 30 minutes. After solid/liquid separation and washing the residue of this leach contained 1.2% $SiO_2$ and 0.3% $Al_2O_3$. The precipitated aluminosilicate was completely removed.

Example 2

A sample of a quartz bearing titania concentrate was fully oxidised with air at 900° C. and then reduced in a fluidised bed using a hydrogen/$CO_2$ mixture such that the final state of virtually all contained iron was the 2+oxidation state. A 700 g sample of this concentrate (whose composition is recorded in Table 2) was then leached at 40 wt % solids density for 4 hours at 175° C. in a solution made up by adding 242 g/L of 40% sodium silicate solution (3.2:1 $SiO_2$:$Na_2O$ weight basis) and 150 g/L of NaOH.

A washed and dried sample of the leach residue had the composition which is also recorded in Table 2. The majority of the residual silica in this material was as a sodium aluminosilicate which has formed during the leach.

A 300 g sample of the leach residue was leached at 10% solids density for 1 hour at 25° C. in a solution of 5% HCL. After this cold acid leach a washed and dried sample of residue had the composition which is also recorded in Table 2.

Clearly the acid leach had been effective for the removal of silica deposited as aluminosilicate in the initial leach.

Example 3

Pellets of a ground titania slag (a product of ilmenite smelting) having a composition recorded in Table 3 were made up with addition of 1% $Na_2B_4O_7$ and roasted at 1000° C. for two hours in a flow of 1:19 $H_2O$/$CO_2$ gas mixture, to oxidise trivalent titania.

A sample of the pellets was then subjected to leaching at 25 wt % solids density with 20% $H_2SO_4$ at 135° C. for 6 hours. The analysis of the leach residue recorded in Table 3 shows that there was negligible removal of silica in the acid leach.

A further sample of the pellets were subjected to leaching with boiling 100 gpL NaOH for 6 hours at 10 wt % solids density at 165° C. The composition of the caustic leach residue is recorded in Table 4. Even at low slurry densities silica is retained as aluminosilicate due to saturation of the leachant with alumina.

The caustic leached residue was subjected to an acid leach with 20% HCL at 30% solids density for 6 hours at reflux. The composition of the residue of acid leaching is recorded in Table 4. The combination of the caustic leach treatment with the acid leach treatment had been highly effective in the removal of silica in the acid leach.

TABLE 1

Composition of Thermally Processed Feed in Example 1.

|  | wt. % |
|---|---|
| $TiO_2$ | 63.4 |
| FeO | 25.7 |
| $SiO_2$ | 3.81 |
| $Al_2O_3$ | 0.83 |
| $Na_2O$ | 0.88 |
| MgO | 0.88 |
| MnO | 1.10 |
| Other | 2.0 |

TABLE 2

Compositions of Feed and Leach Residues in Example 2.

|  | Feed | Alkaline Leach Residue | Acid Leach Residue |
|---|---|---|---|
| $TiO_2$ | 65.7 | 66.4 | 67.7 |
| FeO | 26.5 | 26.9 | 26.4 |
| $SiO_2$ | 3.1 | 0.94 | 0.37 |
| $Al_2O_3$ | 0.8 | 0.67 | 0.49 |
| $Na_2O$ | n.d. | 0.2 | n.d. |
| MgO | 1.1 | 0.88 | 0.88 |
| MnO | 1.1 | 1.2 | 1.2 |
| CaO | n.d. | 0.03 | 0.01 |
| Other* | 1.4 | 2.8 | 2.9 |

*N.B. includes water of hydration.

TABLE 3

Compositions of Slag Feed and Acid Leach Residue in Example 3.

|  | Feed Slag | Acid Leached Slag |
|---|---|---|
| $TiO_2$ | 77.9 | 88 |
| FeO | 9.1 | 4.0 |
| $SiO_2$ | 2.8 | 3.1 |
| $Al_2O_3$ | 3.1 | 0.95 |
| $Na_2O$ | 0.08 | 0.05 |
| MgO | 4.8 | 2.15 |
| MnO | 0.24 | 0.11 |
| CaO | 0.47 | 0.17 |
| Other | 0.5 | 1.5 |

TABLE 4

Compositions of Caustic Leach and Subsequent Acid Leach Residues in Example 3.

|  | Caustic Leach Residue | Acid Leach Residue |
|---|---|---|
| $TiO_2$ | 78.4 | 82.7 |
| FeO | 9.1 | 7.7 |
| $SiO_2$ | 3.1 | 0.96 |
| $Al_2O_3$ | 3.1 | 2.7 |
| $Na_2O$ | n.d. | n.d. |
| MgO | 4.8 | 4.8 |
| MnO | 0.25 | 0.23 |
| CaO | 0.38 | 0.13 |
| Other | 0.9 | 0.8 |

What is claimed is:

1. A process for upgrading titaniferous material containing silica and alumina, comprising the steps of:

(i) smelting the titaniferous material to form a titaniferous slag;

(ii) precipitate the silica as an aluminosilicate which (ii) pretreating the titaniferous slag by alkaline is amenable to further leaching, and (iii) conducting an aqueous room temperature leach of the pretreated titaniferous slag in the presence of an acid to leach the aluminosilicate and cause silica to enter solution under conditions such that the silica is not hydrolysed or precipitated as a silicate.

2. The process defined in claim 1, wherein said pretreating comprises alkaline leaching of the titaniferous material to convert the silica to amorphous or crystalline silicates.

3. The process defined in claim 1, wherein said pretreating comprises a step of roasting the titaniferous material to convert the silica to silicates or to convert the silica to a glassy phase.

4. The process defined in claim 3, wherein the roasting takes place in the presence of an additive.

* * * * *